(12) United States Patent
Yamamoto et al.

(10) Patent No.: US 7,075,644 B2
(45) Date of Patent: Jul. 11, 2006

(54) DEPOLARIZER AND SPECTROSCOPE AND POLYCHROMATER

(75) Inventors: Toshikazu Yamamoto, Kawasaki (JP); Tsutomu Kaneko, Yokohama (JP); Toru Mori, Yokohama (JP)

(73) Assignee: Yokogawa Electric Corporation, Tokyo (JP)

( * ) Notice: Subject to any disclaimer, the term of this patent is extended or adjusted under 35 U.S.C. 154(b) by 361 days.

(21) Appl. No.: 10/629,359

(22) Filed: Jul. 29, 2003

(65) Prior Publication Data
US 2004/0021942 A1 Feb. 5, 2004

(30) Foreign Application Priority Data
Aug. 5, 2002 (JP) ............ P. 2002-227713

(51) Int. Cl.
*G01F 3/28* (2006.01)
(52) U.S. Cl. ..................... 356/326; 359/497
(58) Field of Classification Search ............. 356/326; 359/497
See application file for complete search history.

(56) References Cited

U.S. PATENT DOCUMENTS

| | | | | |
|---|---|---|---|---|
| 3,807,837 A | * | 4/1974 | Schmidt et al. | 359/837 |
| 4,198,123 A | * | 4/1980 | Kremen | 359/496 |
| 2003/0007149 A1 | * | 1/2003 | Yamamoto et al. | 356/328 |

* cited by examiner

*Primary Examiner*—Gregory J. Toatley, Jr.
*Assistant Examiner*—Kara Geisel
(74) *Attorney, Agent, or Firm*—Sughrue Mion, PLLC

(57) ABSTRACT

A depolarizer includes a second birefringent plate having a thickness which continuously changes in a direction of an optical axis of the second birefringent plate; and a third birefringent plate having a thickness which continuously changes in a direction of 45 degree with respect to an optical axis of the third birefringent plate; wherein the second birefringent plate is stuck on the third birefringent plate so that a reduction direction of the thickness of the second birefringent plate and a reduction direction of the thickness of the third birefringent plate are opposite to each other.

9 Claims, 11 Drawing Sheets

1; DEPOLARIZER

1A; CRYSTAL PLATE
1B; CRYSTAL PLATE
1C; CRYSTAL PLATE
1D; CRYSTAL PLATE

1A; CRYSTAL PLATE
1B; CRYSTAL PLATE
1C; CRYSTAL PLATE
1D; CRYSTAL PLATE

PLAN VIEW

FRONT VIEW

SIDE VIEW

1A

PLAN VIEW

FRONT VIEW

SIDE VIEW

1B

PLAN VIEW

FRONT VIEW

SIDE VIEW

1C

PLAN VIEW

FRONT VIEW

SIDE VIEW

1D

US 7,075,644 B2

DEPOLARIZER AND SPECTROSCOPE AND POLYCHROMATER

BACKGROUND OF THE INVENTION

1. Field of the Invention

The present invention relates to a depolarizer, a spectroscope, and a polychromater.

2. Description of the Related Art

In general, a dispersion device which is used in a spectroscope has polarization dependence. Accordingly, when such a light polarized in a particular direction, as a linearly polarized light, is incident on the dispersion device, even though the incident light has the same energy, the dispersion device has a particular output characteristic in accordance with the direction in which the incident light is polarized. A diffraction grating is a representative example of the dispersion device. The diffraction grating has the polarization dependence that the diffraction efficiency varies with a polarization state of the incident light. In other words, a reflectance with the polarized light component perpendicular to a groove cut in the diffraction grating and a reflectance with the polarized light component parallel to the grove are different from each other. Therefore, because the diffraction efficiency varies according to the polarization state of the incident lights in the spectroscope using the diffraction grating, a trouble occurs on measuring a spectroscopic characteristic of the incident light. In order to remove such a polarization dependence, it is necessary to provide a polarization scrambler which converts the incident light having the arbitrary polarization state, into a circular polarized light or no polarized light.

A depolarizer is used as the polarization scrambler. An example of a depolarizer according to a prior art, for example, as disclosed in Japanese Patent No. 2,995,985, will be explained with reference to FIGS. 7A and 7B. A reference numeral 2 denotes a depolarizer which is composed of crystal plates 2A and 2B. The crystal plate 2A has a thickness which continuously changes in a direction of 45 degree with an optical axis 21 thereof, as shown in FIG. 7A. The crystal plate 2B has a thickness which continuously changes in a direction of −45 degree with an optical axis thereof. The depolarizer 2 is constituted by sticking the crystal plates 2A and the crystal plate 2B so that the optical axis 21 and the optical axis 22 intersect orthogonally with each other, as shown in FIG. 7B.

As well known in the art, a crystal has an optical axis extending to a particular direction on the basis of a crystalline structure. When a light enters the crystal, the light is separated to a plane light parallel to the optical axis and a plane light perpendicular to the optical axis. Then, the plane lights travel in the crystal at phase speeds which are different from each other. This phenomenon will be called a birefringence. In other words, the crystal has the birefringence which causes a phase difference between a light component oscillating in a direction parallel to the optical axis and a light component oscillating in a direction perpendicular to the optical axis, of the light which passes through the crystal. The phase difference caused in the crystal is proportional to the thickness of the crystal. Because the thickness of each of the crystal plates 2A and 2B varies continuously, the thickness of each of the crystal plates 2A and 2B is different to a point which the light passes.

More particularly, even though the polarization states of lights L11, L12, and L13 shown in FIG. 7B are equal to one another before the lights L11, L12, and L13 pass through the crystal plates 2A and 2B, because the phase differences which are caused to the lights L11, L12, and L13 in the crystal plates 2A and 2B are different from one another, the polarization states of the lights L11, L12, and L13 are different from one another after the lights L11, L12, and L13 pass through the crystal plates 2A and 2B. Accordingly, it is possible that the depolarizer 2 converts the polarization state of the light to the state wherein a large number of polarization states are mixed with respect to a space. In other words, the depolarizer 2 disturbs the polarization states of the lights with respect to a space. However, the depolarizer 2 does not have an effect with respect to the incident light which oscillates in the direction parallel or perpendicular to the optical axis 21 or 22. As a result, such an incident light passes through the depolarizer 2 with keeping the polarization state before the incident light enters the depolarizer 2.

FIG. 8 is a view showing a configuration of spectroscope which uses the depolarizer 2. In FIG. 8, a reference numeral 3 denotes an incident slit. A reference numeral 4 denotes a concave mirror. A reference numeral 5 denotes a diffraction grating. A reference numeral 6 denotes a concave mirror. A reference numeral 7 represents an outgoing slit. The light which passes through the incident slit 3 is diffracted with a different angle by the diffraction grating 5 on the basis of the wavelength of the light. The angle of the diffraction grating 5 determines the wavelength component of the light that passes through the outgoing slit 7 and reaches the light receiving unit 8A. In other words, it is possible to sweep the wavelength component of the light and to obtain a spectrum of the light by rotating the diffraction grating 5 towards a rotational direction. The depolarizer 2 is positioned after the incident slit 3 so as to direct the optical axis thereof in a direction of 45 degree with grooves of the diffraction grating 5.

The depolarizer 2 makes the incident light have the state wherein a large number of polarization states are mixed. When the incident light oscillating in the direction parallel or perpendicular to the optical axis of the depolarizer 2, is incident on the depolarizer 2, the incident light passes through the depolarizer 2 with keeping the polarization state before the light enters the depolarizer 2. After the incident light passes through the depolarizer 2, the incident light enters the diffraction grating 5 with the angle of 45 degree with the grooves of the diffraction grating 5. Therefore, even though the incident light is incident on the depolarizer 2 in any the polarization state, the incident light is incident on the diffraction grating 5 in an always constant ratio between the light component oscillating in the direction perpendicular to the grooves of the diffraction grating 5 and the light component oscillating in the direction parallel to the grooves of the diffraction grating 5. As a result, diffraction efficiency does not vary in the spectroscope according to the polarization state of the incident light.

By the way, because the optical axis 21 of the crystal plate 2A and the optical axis 22 of the crystal plate 2B intersect orthogonally with each other in the above-mentioned conventional depolarizer 2, the light which is parallel to the optical axis 21 of the crystal plate 2A is perpendicular to the optical axis 22 of crystal plate 2B. Therefore, because refractive indexes are different from each other at both sides of the inclined surface between the crystal plates 2A and 2B, the light is refracted on the inclined surface. Furthermore, a refraction angle to the light component oscillating in the direction parallel to the optical axis 21 of the crystal sheet 2A and a refraction angle to the light component oscillating in the direction perpendicular to the optical axis 21 of the crystal plate 2A are different from each other. More specifically, a light component of an incident light I11 shown in FIG. 9, oscillating in the direction parallel to the optical axis 21 becomes a refracted light R11. Further, a light component of the incident light I11, oscillating in the direction perpendicular to the optical axis 21 becomes a refracted light R12. In other words, there is a problem in which the incident light is separated into two light rays along the direction of the inclined surface in depolarizer 2.

Accordingly, in also the spectroscope shown in FIG. 8, the light is separated into two light rays in the depolarizer 2. As a result, two focal point positions are formed on the outgoing slit 7. FIGS. 10A and 10B are front views of the outgoing slit 7 shown in FIG. 8. In FIG. 10A, a reference mark F12 denotes a focal point position in case the depolarizer 2 is not provided in the spectroscope. Reference marks F11 and F13 denote focal point positions in case the depolarizer 2 is provided in the spectroscope.

Power of each of the light ray which has the focal point position F11 and the light ray which has the focal point position F13 varies according to the polarization state of the incident light. Using Jones vector notation representative of the polarization state of the light, it is possible to express an incident light E0 having an arbitrary completely polarization state as shown in Equation (1). A first component of Equation (1) represents a scalar value of an X directional component, and a second component of Equation (1) represents a scalar value of a Y directional component. In Equation (1), "f" represents a frequency, "$\delta_0$" represents an initial phase, "$\delta$" represents a phase difference between the X directional component and the Y directional component, and "$\phi$" represents an azimuth angle.

$$E_0 = \frac{1}{\sqrt{2}} \begin{pmatrix} \cos\phi & -\sin\phi \\ \sin\phi & \cos\phi \end{pmatrix} \begin{pmatrix} \exp\left(\frac{-i\delta}{2}\right) \\ \exp\left(\frac{\delta}{2}\right) \end{pmatrix} \exp[i(2\pi f t - \delta_0)] \quad (1)$$

When incident light represented by Equation (1) passes through the depolarizer 2, the incident light is separated into two light rays R11 and R12. Then, the light rays R11 and R12 which have passed through the diffraction grating 5 come into two focal points F11 and F13 on the outgoing slit 7 as shown in FIG. 10B, respectively.

In FIG. 10B, "$E_1$" of Equation (2) represents the state of the light ray at the focal point F11, and "$P_1$" of Equation (3) represents the power of the light ray at the focal point F11. "$E_2$" of Equation (4) represents the state of the light ray at the focal point F13, and "$P_2$" of Equation (5) represents the power of the light ray at the focal point F13. "$P_\theta$" of Equation (6) represents a partial polarizer of the azimuth angle $\theta$. "G" of Equation (7) represents a diffraction grating whose diffractive efficiency of the X directional component is equal to a and whose diffraction efficiency of the Y directional component is equal to $\beta$. "*" represents a complex conjugate in each of Equations (3) and (5). As readily understood from Equation (8), a total intensity of the light rays at two focal points F11 and F13 is a constant regardless of the state of the incident light $E_0$. However, as readily understood from Equations (3) and (5), an intensity ratio between the light ray at the focal point F11 and the light ray at the focal point F13 varies in accordance with the state of the incident light $E_0$.

$$E_1 = G \cdot P_{45°} \cdot E_0 = \frac{1}{\sqrt{2}}\left(\cos\phi \cdot \cos\frac{\delta}{2} - i \cdot \sin\phi \cdot \sin\frac{\delta}{2}\right)\begin{pmatrix} \alpha \\ \beta \end{pmatrix}\exp[i(2\pi f t - \delta_0)] \quad (2)$$

$$P_1 = E_1 \cdot E_1^* = \frac{1}{2}\left(\cos^2\phi \cdot \cos^2\frac{\delta}{2} + \sin^2\phi \cdot \sin^2\frac{\delta}{2}\right)(\alpha^2 + \beta^2) \quad (3)$$

$$E_2 = G \cdot P_{-45°} \cdot E_0 = \frac{1}{\sqrt{2}}\left(\sin\phi \cdot \cos\frac{\delta}{2} + i \cdot \cos\phi \cdot \sin\frac{\delta}{2}\right)\begin{pmatrix} -\alpha \\ \beta \end{pmatrix}\exp[i(2\pi f t - \delta_0)] \quad (4)$$

$$P_2 = E_2 \cdot E_2^* = \frac{1}{2}\left(\sin^2\phi \cdot \cos^2\frac{\delta}{2} + \cos^2\phi \cdot \sin^2\frac{\delta}{2}\right)(\alpha^2 + \beta^2) \quad (5)$$

$$P_\theta = \begin{pmatrix} \cos^2\theta & \cos\theta \cdot \sin\theta \\ \cos\theta \cdot \sin\theta & \sin^2\theta \end{pmatrix} \quad (6)$$

$$G = \begin{pmatrix} \alpha & 0 \\ 0 & \beta \end{pmatrix} \quad (7)$$

$$P = P_1 + P_2 = \frac{1}{2}(\alpha^2 + \beta^2) \quad (8)$$

In the spectroscope shown in FIG. 8, the two light rays into which the light passing through the depolarizer 2 is separated, is reflected by the concave mirror 4 and is diffracted by the diffraction grating 5. Equation (9) represents a relationship between an incident angle and a diffraction angle of the diffraction grating 5. In Equation (9), "m" represents the diffraction order, "d" represents a grating constant of the diffraction grating 5, "$\lambda$" represents a wavelength of the light, "$\xi$" represents an angle between the incident light and a surface perpendicular to grating grooves of the diffraction grating 5. "$\Psi_1$" represents an incident angle of the incident light on the diffraction grating 5, and "$\Psi_2$" represents a diffraction angle of the diffracted light by the diffraction grating 5.

$$m\lambda = d \cos \xi (\sin \psi_1 + \sin \psi_2) \quad (9)$$

FIG. 11 is a view showing a relationship of the angle $\xi$, the incident angle $\Psi_1$, and the diffraction angle $\Psi_2$. Under restriction of positions of the parts, there is a case that the light is reflected with deviating from an axis of the concave mirror 4, and inputted to the diffraction grating 5 so as to be inclined in the Y axis direction. More particularly, in an eight stages spectroscope disclosed in Japanese Patent Application No. 2001-335385, the refracted lights R11 and R12 are inclined on the diffraction grating 5 with same incident angles $\Psi_1$ with each other but the different diffraction angles $\xi$. Therefore, as readily understood from Equation (9), Because two light rays R11 and R12 are outputted from the diffraction grating 5 with diffractive angles $\Psi_2$ different from each other, there occurs displacement in two light rays R11 and R12 in the X axis direction shown in FIG. 8. As a result, as shown in FIG. 10B, two focal points F11 and F13 are formed in a slanting direction with the cutting direction of the outgoing slit 7. In other words, focal points F11 and F13 are provided at the different positions in the direction perpendicular to the cutting direction of the outgoing slit 7.

As described above, if the focal points F11 and F13 are provided at the different positions in the direction perpendicular to the cutting direction of the outgoing slit 7, and as explained with reference to Equations (3) and (5), the intensity ratio between the light rays at the two focal points F11 and F13 varies in accordance with the state of the incident light, the spectroscope outputs a measured central wavelength which is different from a true central wavelength.

FIGS. 12A to 12C are views showing spectrum waveforms which are outputted to a spectrum display unit 10 shown in FIG. 8. FIG. 12A is a view showing a measured spectrum in case the light is not separated, and one focal point is formed on the outgoing slit 7. FIG. 12B is a view showing a measured spectrum in case the intensity ratio between the light rays at two focal points F11 and F13 shown in FIG. 10B is equal to 1:0. FIG. 12C is a view showing a measured spectrum in case the intensity ratio between the light rays at the two focal points F11 and F13 shown in FIG. 10B is equal to 0:1. In FIGS. 12A to 12C, "$\lambda_0$" represents the true central wavelength of the incident light, and "$\Delta\lambda$" represents a difference between the true central wavelength and the measured central wavelength. The measured spectrum obtained by the spectroscope using the depolarizer 2 varies from the state shown in FIG. 12B to the state shown in FIG. 12C, in accordance with the polarization state of the light. As a result, it is difficult to measure the true central wavelength.

If any one of the powers of the light rays at two focal points F11 and F13 of the outgoing slit 7 shown in FIG. 10B, concerning the incident light in the arbitrary polarization state is always equal to zero, and the other of the powers is always constant, it is possible to obtain the spectrum having a stable central wave length concerning the arbitrary polarization state. For example, if it is possible to always obtain the state shown in FIG. 12A, it is possible to measure the spectrum having the true central wavelength.

In addition, although there are a depolarizer and a spectroscope which is disclosed in Japanese Patent Application No. 2001-196745 and which obtain a spectrum having a stable central wavelength concerning the incident light in the arbitrary polarization state, the depolarizer and a spectroscope can only use in case the diffraction efficiency $\alpha$ in the X directional component and the diffraction efficiency $\beta$ in the Y directional component of a spectroscopic diffraction grating which is used in the spectroscope are equal to $\alpha=1$ and $\beta=0$ or $\alpha=0$ and $\beta=1$.

SUMMARY OF THE INVENTION

The present invention was developed in view of the above-mentioned problems. It is an object of the present invention to measure a spectrum having a true central wavelength by eliminating a polarization dependence of a spectroscopic device, concerning an incident light in an arbitrary polarization state.

In order to attain the above-mentioned object, according to a first aspect of the present invention, a depolarizer comprises: a second birefringent plate having a thickness which continuously changes in a direction of an optical axis of the second birefringent plate; and a third birefringent plate having a thickness which continuously changes in a direction of 45 degree with respect to an optical axis of the third birefringent plate; wherein the second birefringent plate is stuck on the third birefringent plate so that a reduction direction of the thickness of the second birefringent plate and a reduction direction of the thickness of the third birefringent plate are opposite to each other.

The depolarizer may further comprise: a first birefringent plate having a thickness which continuously changes in a direction perpendicular to an optical axis of the first birefringent plate; wherein the first birefringent plate is stuck on the second birefringent plate so that a reduction direction of the thickness of the first birefringent plate and the reduction direction of the thickness of the second birefringent plate are opposite to each other.

The depolarizer may further comprise: a fourth birefringent plate having a thickness which continuously changes in a direction of −45 degree with respect to an optical axis of the fourth birefringent plate; wherein the fourth birefringent plate is stuck on the third birefringent plate so that a reduction direction of the thickness of the fourth birefringent plate and the reduction direction of the thickness of the third birefringent plate are opposite to each other.

The depolarizer may further comprise: a first birefringent plate having a thickness which continuously changes in a direction perpendicular to an optical axis of the first birefringent plate; and a fourth birefringent plate having a thickness which continuously changes in a direction of −45 degree with respect to an optical axis of the fourth birefringent plate; wherein the first birefringent plate is stuck on the second birefringent plate so that a reduction direction of the thickness of the first birefringent plate and the reduction direction of the thickness of the second birefringent plate are opposite to each other; the fourth birefringent plate is stuck on the third birefringent plate so that a reduction direction of the thickness of the fourth birefringent plate and the reduction direction of the thickness of the third birefringent plate are opposite to each other.

Each of the first to fourth birefringent plates may be composed of a selected one of crystal, calcite, mica, magnesium fluoride, $YVO_4$, and rutile, in the depolarizer.

According to a second aspect of the invention, in a spectroscope comprises: the depolarizer described above, which is positioned at a previous stage of a spectroscopic device; wherein a reduction direction of the thickness of the second birefringent plate and a dispersion direction of the spectroscopic device intersect orthogonally with each other.

A light incident surface of the second birefringent plate may be inclined with respect to an incident direction of the light in the depolarizer of the spectroscope.

A light may pass through the spectroscopic device at several times in the spectroscope.

According to a third aspect of the present invention, a polychromater comprises: the depolarizer described above, which is positioned at a previous stage of a spectroscopic device; and an one-dimensional optical detector for detecting an output light of the spectroscopic device, in parallel.

BRIEF DESCRIPTION OF THE DRAWINGS

The present invention will become more fully understood from the detailed description given hereinafter and accompanying drawings given by way of illustration only, and thus are not intended as a definition of limits of the present invention, and wherein.

PREFERRED EMBODIMENTS OF THE INVENTION

Hereinafter, description will be made as regards a depolarizer, a spectroscope, and a polychromater according to a preferred embodiment of the present invention.

Figure 1A:
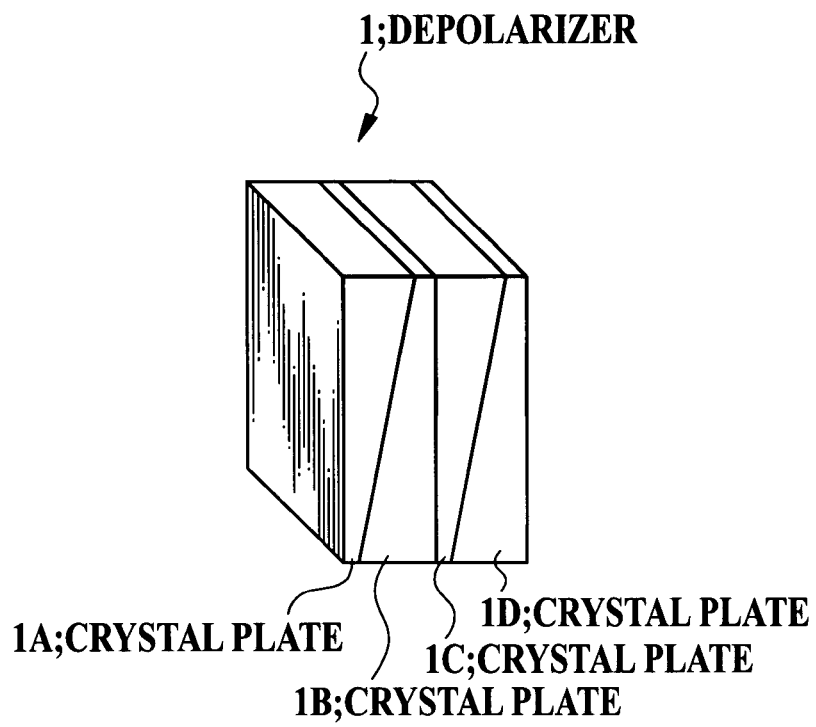
FIG. 1A is a perspective view.
Figure 1B:
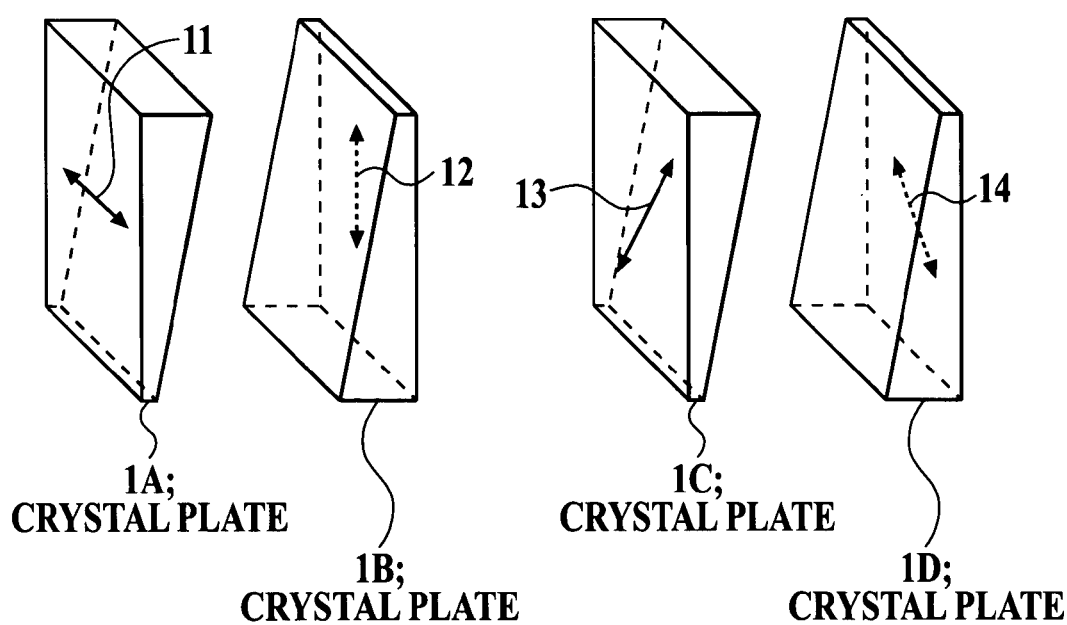
FIG. 1B is an exploded perspective view, of a depolarizer 1 according to an embodiment of the present invention.
Figure 2A:
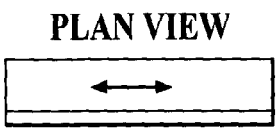
FIGS. 2A to 2D are a plan view, a front view, and a side view of crystal plates 1A, 1B, 1C, and 1D, respectively, in the depolarizer 1 according to the embodiment of the present invention.
Figure 2A:
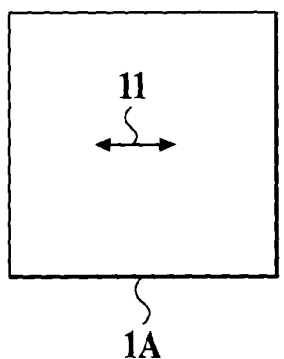
Figure 2A:
Figure 2B:
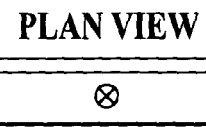
Figure 2B:
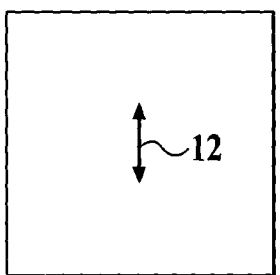
Figure 2B:
Figure 2C:
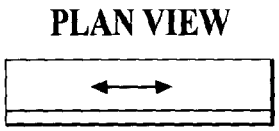
Figure 2C:
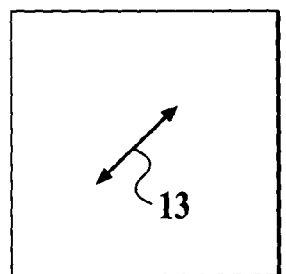
Figure 2C:
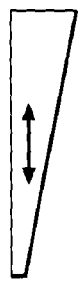
Figure 2D:
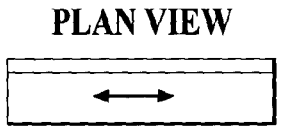
Figure 2D:
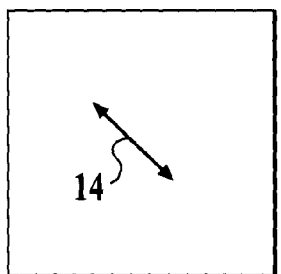
Figure 2D:
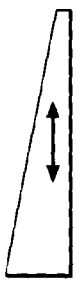

FIGS. 1A and 1B are a perspective view and an exploded perspective view showing a configuration of a depolarizer 1 according to an embodiment of the present invention. FIGS. 2A to 2D are a plan view, a front view, and a side view of crystal plates 1A, 1B, 1C, and 1D, respectively, in the depolarizer 1. As shown in FIGS. 1A and 1B and FIGS. 2A to 2D, the depolarizer 1 comprises crystal plates 1A to 1D which are stuck so that so that optical axes 11, 12, 13, and 14 are directed towards directions different from one another. Each of the crystal plates 1A to 1D has a trapezoidal shape whose thickness continuously changes in a particular direction. The depolarizer 1 has a constant thickness on the whole, on sticking the crystal plates 1A to 1D. In other words, the depolarizer 1 has the constant thickness on the whole in a light transparent direction.

The first crystal plate 1A has the trapezoidal shape whose thickness continuously changes in the direction perpendicular to the optical axis 11 thereof. The second crystal plate 1B has the trapezoidal shape whose thickness continuously changes in the direction parallel to the optical axis 12 thereof. The third crystal plate 1C has the trapezoidal shape whose thickness continuously changes in the direction of 45 degree with respect to the optical axis 13 thereof. The fourth crystal plate 1D has the trapezoidal shape whose thickness continuously changes in the direction of −45 degree with respect to the optical axis 14 thereof.

Such four crystal plates 1A to 1D are superposed so that the crystal plates 1A to 1D compensates the thickness thereof with one of the adjacent crystal plate. In other words, the reduction (increase) direction of the thickness of the first crystal plate 1A is opposite to the reduction direction of the thickness of the second crystal plate 1B. The reduction direction of the thickness of the second crystal plate 1B is opposite to the reduction direction of the thickness of the third crystal plate 1C. Furthermore, the reduction direction of the thickness of the third crystal plate 1C is opposite to the reduction direction of the thickness of the fourth crystal plate 1D.

As a result, the optical axis 11 of the first crystal plate 1A and the optical axis 12 of the second crystal plate 1B intersect orthogonally with each other. An angle between the optical axis 12 of the second crystal plate 1B and the optical axis 13 of the third crystal plate 1C is 45 degree. Furthermore, the optical axis 13 of the third crystal plate 1C and the optical axis 14 of the fourth crystal plate 1D intersect orthogonally with each other. When looking the depolarizer 1 constructed by sticking the crystal plates 1A to 1D, as the whole, there is a relationship in which four optical axes 11 to 14 of the crystal plates 1A to 1D has the angle of 45 degree with one another.

In the depolarizer 1 described above, because the thickness of each of the crystal plates 1A to 1D continuously changes, the thickness or the transparent distance of each of the crystal plates 1A to 1D, through which the light passes, changes according to the position (transparent position) through which the light passes. Accordingly, because the phase difference which occurs in the crystal plates 1A to 1D changes according to the position through which the light passes, it is possible that the depolarizer 1 converts the polarization state of the light to the state wherein a number of polarization states are mixed with respect to a space.

There does not occur the phase difference of the polarized light which oscillates in a direction parallel or perpendicular to the optical axis 12 of the second crystal plate 1B, in the first crystal plate 1A and the second crystal plate 1B. However, there occurs the phase difference of the polarized light in the third crystal plate 1C and the fourth crystal plate 1D, or in only the crystal plate 1C in case the crystal plate 1D is omitted from the depolarizer 1. As a result, the light has the state wherein a number of polarization states are mixed. Furthermore, there does not occur the phase difference of the polarized light which oscillates in a direction parallel or perpendicular to the optical axis 13 of the third crystal plate 1C, in the third crystal plate 1C and the fourth crystal plate 1D. However, there occurs the phase difference of the polarized light in the first crystal plate 1A and the second crystal plate 1B, or in only the crystal plate 1B in case the crystal plate 1A is omitted from the depolarizer 1. As a result, the light has the state wherein a number of polarization states are mixed.

Figure 8:
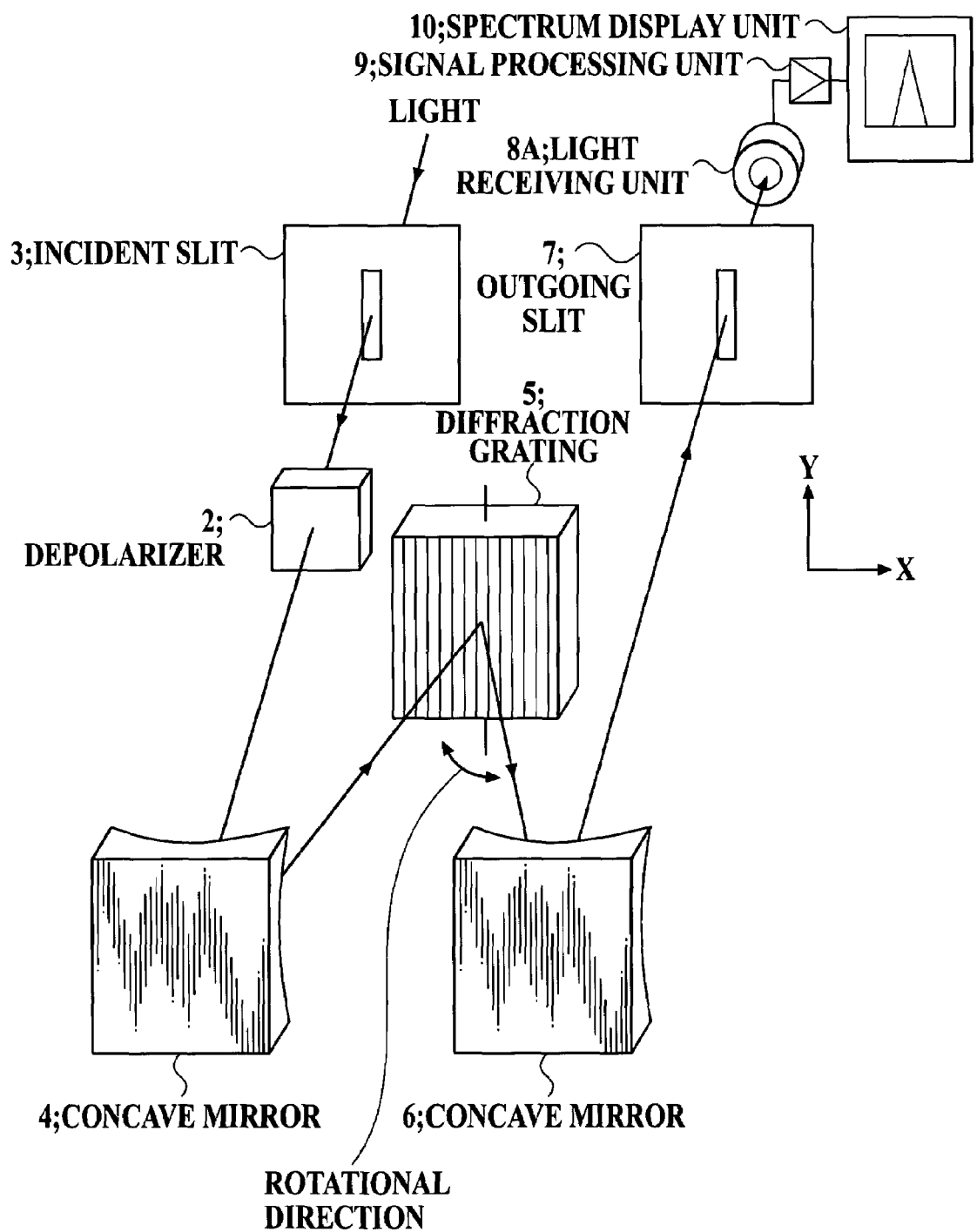
FIG. 8 is a view showing a configuration of a conventional spectroscope.
Figure 9:
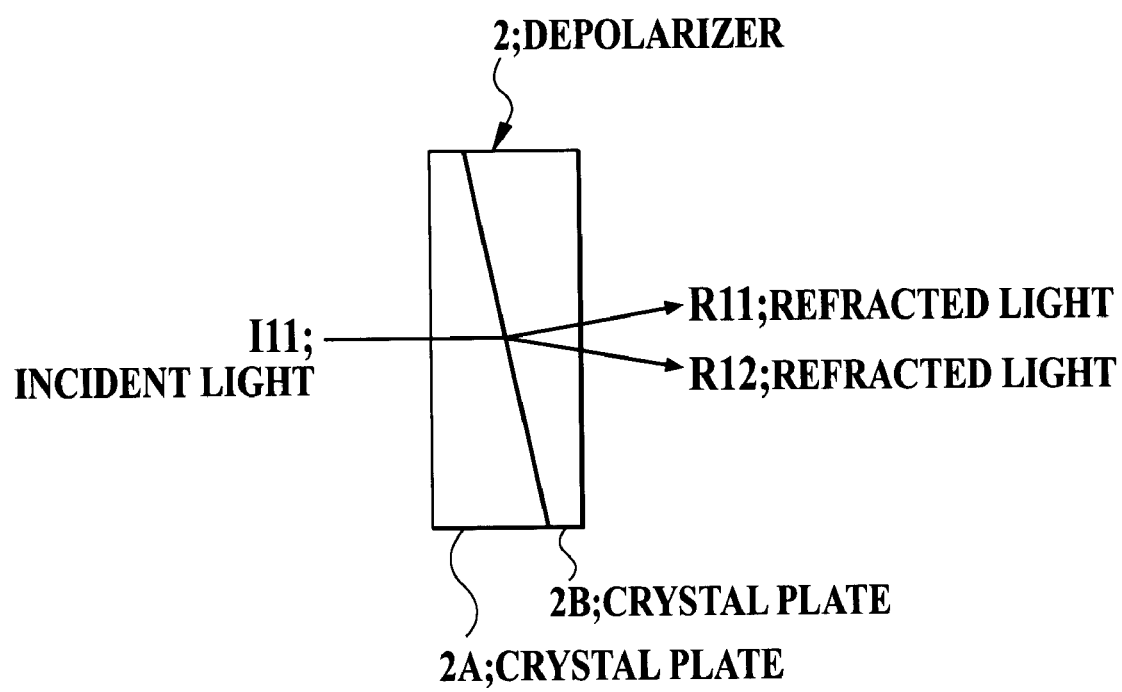
FIG. 9 is a view for describing a characteristic of the conventional depolarizer 2.
Figure 10A:
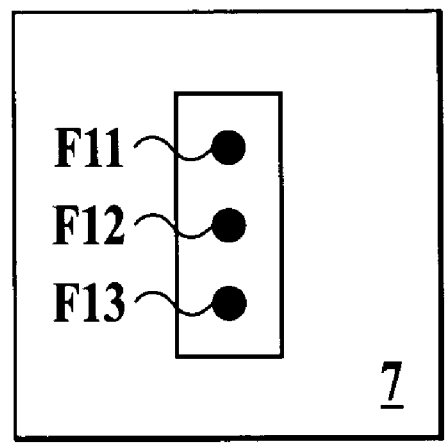
FIGS. 10A and 10B are views for describing a spectroscopic performance of the conventional spectroscope.
Figure 10B:
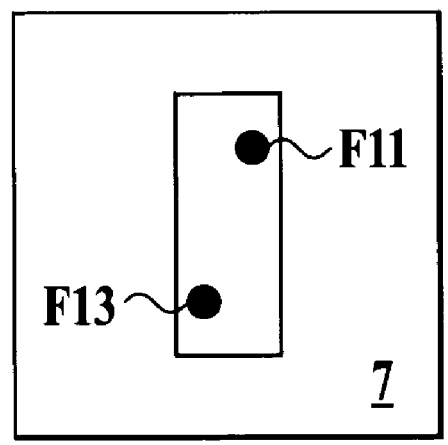
Figure 11:
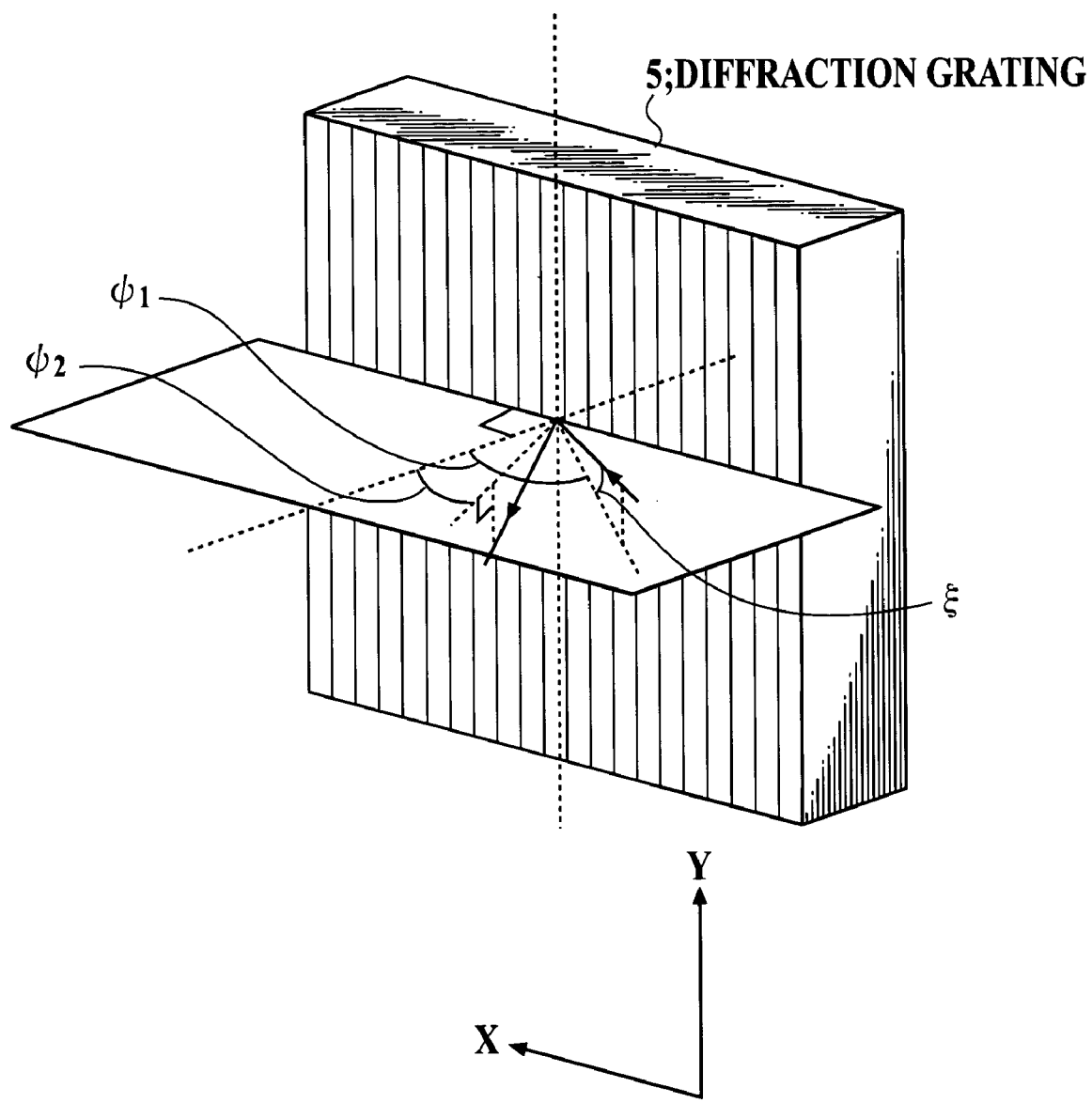
FIG. 11 is a view for describing a diffractive function of a diffraction grating 5 used in the conventional spectroscope.

Next, description will be made as regards a spectroscope (monochromater) using the above-mentioned depolarizer 1, with reference to FIG. 3. The spectroscope according to an embodiment of the present invention is characterized by using the depolarizer 1 of the embodiment of the present invention instead of the conventional depolarizer 2. The spectroscope according to the embodiment of the present invention comprises parts similar to the conventional spectroscope described with reference to FIG. 8 and are designated by like reference numerals. The description will be omitted with respect to the parts similar to the conventional spectroscope.

Figure 3:
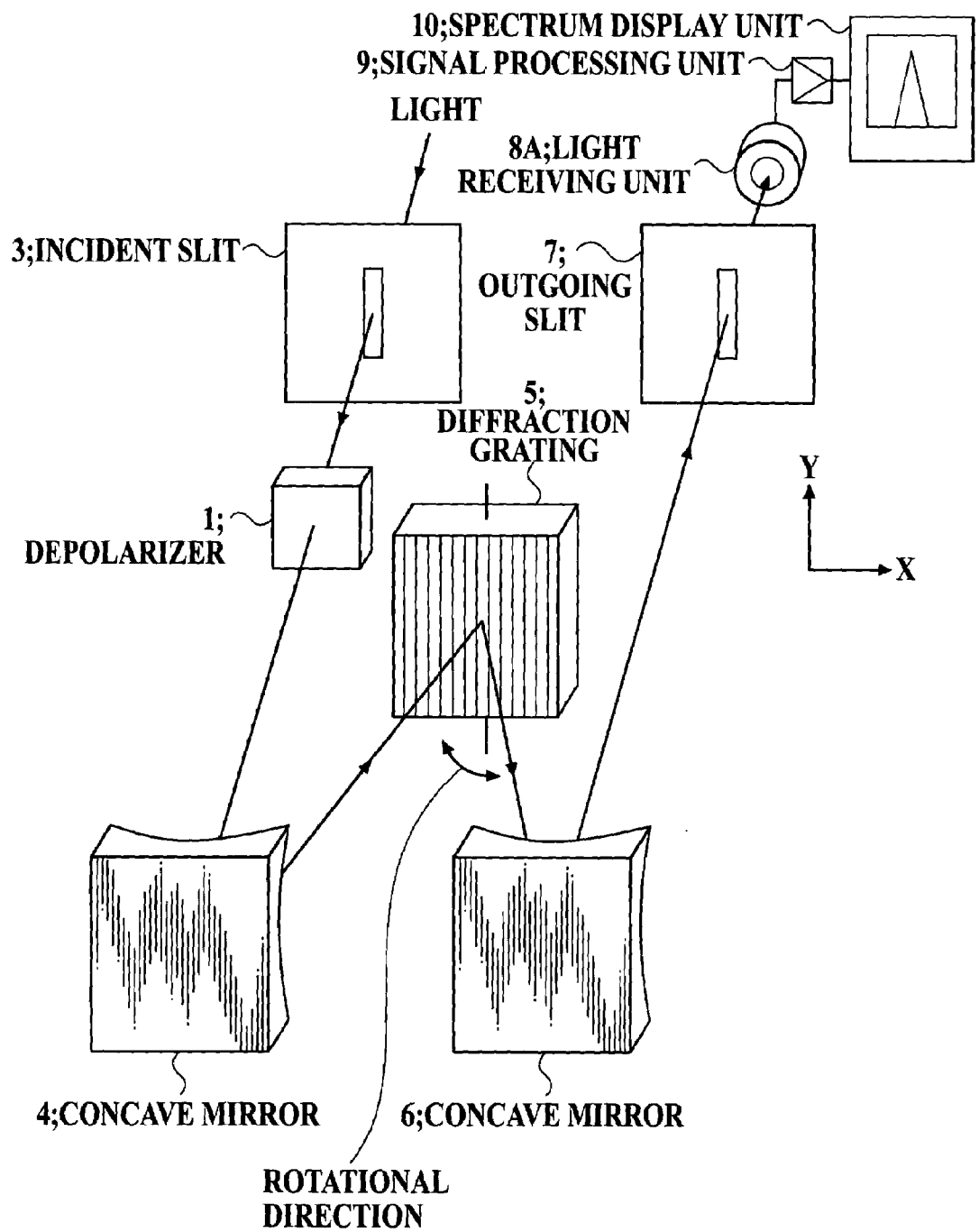
FIG. 3 is a view showing a configuration of a spectroscope (monochromater) according to an embodiment of the present invention.

As shown in FIG. 3, the depolarizer 1 is positioned along an optical path after the incident slit 3 in the spectroscope according to the embodiment of the present invention. Furthermore, the depolarizer 1 is positioned along the optical path so that direction in which the thickness of the crystal plate 1B continuously changes and the dispersion direction of the diffraction grating 5 which is used as a spectroscopic device, intersect orthogonally with each other. As a result, the direction of the inclined surface formed on each of the crystal plates 1A to 1D is parallel to a groove direction of the diffraction grating 5. In addition, the outer surfaces of the second and the third crystal plates 1B and 1C, opposite to surfaces of the second and the third crystal plate 1B and 1C, which are stuck on each other, are directed in a direction inclined with the incident light. In other words, the outer surfaces of the second and the third crystal plates 1B and 1C are two inclined surfaces which are a demarcation surface between the first crystal plate 1A (air in case the first crystal plate 1A is omitted from the depolarizer 1) and the second crystal plate 1B, and a demarcation surface between the third crystal plate 1C and the fourth crystal plate 1D (air in case the fourth crystal plate 1A is omitted from the depolarizer 1).

Figure 4:
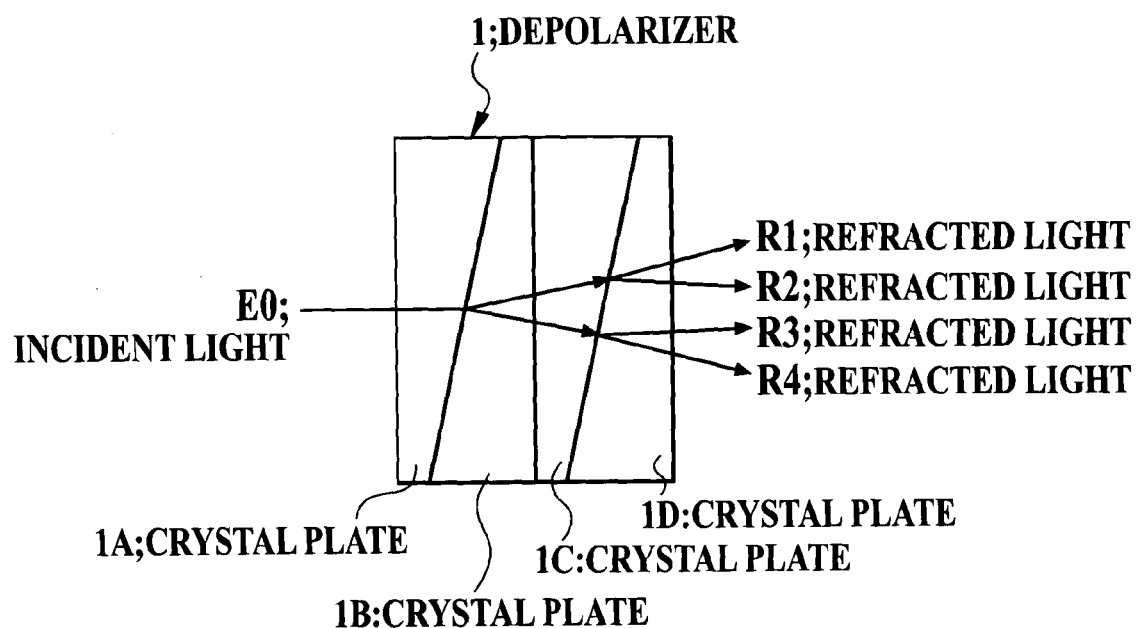
FIG. 4 is a view for describing a characteristic of the depolarizer 1 according to the embodiment of the present invention.

In the spectroscope described above, because the optical axis 11 of the first crystal plate 1A and the optical axis 12 of the second crystal plate 1B intersect orthogonally with each other, the light oscillating in a direction parallel to the optical axis 11 of the first crystal plate 1A oscillates in a direction perpendicular to the optical axis 12 of the second crystal plate 1B. Because the crystalline structure such as a crystal having the birefringence, has the refraction index to the light wave oscillating in a direction parallel to the optical axis and the refraction index to the light wave oscillating in a direction perpendicular to the optical axis, which are different from each other, the refraction indexes are different in both sides of the inclined surface which is the demarcation surface between the first crystal plate 1A (air in case the first crystal plate 1A is omitted from the depolarizer 1) and the second crystal plate 1B. Therefore, the light is refracted on the demarcation surface (inclined surface) between the first crystal plate 1A and the second crystal plate 1B. Furthermore, the refraction angle of the light component oscillating in the direction parallel to the optical axis 12 of the second crystal plate 1B is different from the refraction angle of the light component oscillating in the direction perpendicular to the optical axis 12 of the second crystal plate 1B. As a result, the incident light E0 is separated into two refracted lights, as shown in FIG. 4.

Furthermore, because the optical axis 13 of the third crystal plate 1C and the optical axis 14 of the fourth crystal plate 1D are intersect orthogonally with each other, the light oscillating in a direction parallel to the optical axis 13 of the third crystal plate 1C oscillates in a direction perpendicular to the optical axis 14 of the fourth crystal plate 1D. Therefore, because the refraction indexes are different in both sides of the inclined surface which is the demarcation surface between the third crystal plate 1C and the fourth crystal plate 1D (air in case the fourth crystal plate is omitted from the depolarizer 1), the light is refracted on the demarcation surface (inclined surface) between the third crystal plate 1C and the fourth crystal plate 1D. Furthermore, the refraction angle of the light component oscillating in the direction parallel to the optical axis 13 of the third crystal plate 1C is different from the refraction angle of the light component oscillating in the direction perpendicular to the optical axis 13 of the third crystal plate 1C. As a result, the two refracted lights are separated into four refracted lights R1 to R4, as shown in FIG. 4.

Using Jones vector notation representative of the polarization state of the light, it is possible to express the incident light E0 having the arbitrary completely polarization state as shown in Equation (10). In Equation (10), "f" represents the frequency, "$\delta_0$" represents the initial phase, "$\delta$" represents the phase difference between the X directional component and the Y directional component, and "$\phi$" represents the azimuth angle. A first component of Equation (10) represents a scalar value of the X directional component, and a second component of Equation (10) represents a scalar value of the Y directional component.

$$E_0 = \frac{1}{\sqrt{2}} \begin{pmatrix} \cos\phi & -\sin\phi \\ \sin\phi & \cos\phi \end{pmatrix} \begin{pmatrix} \exp\left(\frac{-i\delta}{2}\right) \\ \exp\left(\frac{\delta}{2}\right) \end{pmatrix} \exp[i(2\pi f t - \delta_0)] \quad (10)$$

Figure 5:
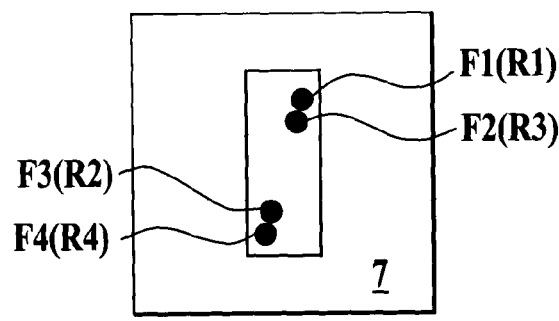
FIG. 5 is a view for describing a spectroscopic performance of the spectroscope according to the embodiment of the present invention.

When such an incident light $E_0$ passes through the depolarizer 1, the incident light $E_0$ is separated into four light rays R1 to R4, as shown in FIG. 4, The light rays R1 to R4 pass through the diffraction grating 5. Thereafter, the light rays R1 to R4 come into four focal points F1 to F4 on the outgoing slit 7, as shown in FIG. 5. In FIG. 5, the light rays R1, R3, R2, and R4 come into the focal points F1, F2, F3, and F4, respectively.

As the inclined angle of the inclined surface of the second crystal plate 1B becomes small, the distance between the focal points F1 and F2 and the distance between focal points F3 and F4 become small. Furthermore, as the inclined angle of the inclined surface of the third crystal plate 1C becomes small, the distance between the focal points F1 and F3 and the distance between focal points F2 and F4 become small. When the inclined angle of the inclined surface of the second crystal plate 1B is smaller than the inclined angle of the inclined surface of the third crystal plate 1C, the distance between the focal points F1 and F2 and the distance between the focal points F3 and F4 becomes smaller than the distance between the focal points F1 and F3 and the distance between the focal points F2 and F4.

The "E1" of Equation (11) represents the state of light ray at the focal point F1, and "P1" of Equation (12) represents the power of the light ray at the focal point F1. In addition, "E2" of Equation (13) represents the state of light ray at the focal point F2, and "P2" of Equation (14) represents the power of the light ray at the focal point F2. "E3" of Equation (15) represents the state of light ray at the focal point F3, and "P3" of Equation (16) represents the power of the light ray at the focal point F3. Furthermore, "E4" of Equation (17) represents the state of light ray at the focal point F4, and "P4" of Equation (18) represents the power of the light ray at the focal point F4. "$P_\theta$" of Equation (19) represents a partial polarizer of the azimuth angle θ. "G" of Equation (20) represents a diffraction grating whose diffractive efficiency of the X directional component is equal to α and whose diffraction efficiency of the Y directional component is equal to β. "*" represents a complex conjugate in each of Equations (12), (14), (16), and (18).

$$E_1 = G \cdot P_{45°} \cdot P_{0°} \cdot E_0 = \frac{1}{2}\begin{pmatrix}\alpha\\\beta\end{pmatrix}\left(\cos\left(\phi+\frac{\pi}{4}\right)\cos\left(\frac{\delta}{2}\right) - i \cdot \cos\left(\phi-\frac{\pi}{4}\right)\sin\left(\frac{\delta}{2}\right)\right)\exp[i(2\pi f t - \delta_0)] \quad (11)$$

$$P_1 = E_1 \cdot E_1^* = \frac{\alpha^2 + \beta^2}{4}\left(\cos^2\left(\phi+\frac{\pi}{4}\right)\cos^2\left(\frac{\delta}{2}\right) + \cos^2\left(\phi-\frac{\pi}{4}\right)\sin^2\left(\frac{\delta}{2}\right)\right) \quad (12)$$

$$E_2 = G \cdot P_{45°} \cdot P_{90°} \cdot E_0 = \frac{1}{2}\begin{pmatrix}\alpha\\\beta\end{pmatrix}\left(\cos\left(\phi-\frac{\pi}{4}\right)\cos\left(\frac{\delta}{2}\right) + i \cdot \cos\left(\phi+\frac{\pi}{4}\right)\sin\left(\frac{\delta}{2}\right)\right)\exp[i(2\pi f t - \delta_0)] \quad (13)$$

$$P_2 = E_2 \cdot E_2^* = \frac{\alpha^2 + \beta^2}{4}\left(\cos^2\left(\phi-\frac{\pi}{4}\right)\cos^2\left(\frac{\delta}{2}\right) + \cos^2\left(\phi+\frac{\pi}{4}\right)\sin^2\left(\frac{\delta}{2}\right)\right) \quad (14)$$

$$E_3 = G \cdot P_{-45°} \cdot P_{0°} \cdot E_0 = \frac{1}{2}\begin{pmatrix}\alpha\\-\beta\end{pmatrix}\left(\cos\left(\phi+\frac{\pi}{4}\right)\cos\left(\frac{\delta}{2}\right) - i \cdot \cos\left(\phi-\frac{\pi}{4}\right)\sin\left(\frac{\delta}{2}\right)\right)\exp[i(2\pi f t - \delta_0)] \quad (15)$$

$$P_3 = E_3 \cdot E_3^* = \frac{\alpha^2 + \beta^2}{4}\left(\cos^2\left(\phi+\frac{\pi}{4}\right)\cos^2\left(\frac{\delta}{2}\right) + \cos^2\left(\phi-\frac{\pi}{4}\right)\sin^2\left(\frac{\delta}{2}\right)\right) \quad (16)$$

$$E_4 = G \cdot P_{-45°} \cdot P_{90°} \cdot E_0 = \frac{1}{2}\begin{pmatrix}-\alpha\\\beta\end{pmatrix}\left(\cos\left(\phi-\frac{\pi}{4}\right)\cos\left(\frac{\delta}{2}\right) + i \cdot \cos\left(\phi+\frac{\pi}{4}\right)\sin\left(\frac{\delta}{2}\right)\right)\exp[i(2\pi f t - \delta_0)] \quad (17)$$

$$P_4 = E_4 \cdot E_4^* = \frac{\alpha^2 + \beta^2}{4}\left(\cos^2\left(\phi-\frac{\pi}{4}\right)\cos^2\left(\frac{\delta}{2}\right) + \cos^2\left(\phi+\frac{\pi}{4}\right)\sin^2\left(\frac{\delta}{2}\right)\right) \quad (18)$$

$$P_\theta = \begin{pmatrix} \cos^2\theta & \cos\theta \cdot \sin\theta \\ \cos\theta \cdot \sin\theta & \sin^2\theta \end{pmatrix} \quad (19)$$

$$G = \begin{pmatrix} \alpha & 0 \\ 0 & \beta \end{pmatrix} \quad (20)$$

As described above, when the inclined angle of the inclined surface of the second crystal plate 1B is small comparatively, the distance between the focal points F1 and F2 becomes small on the outgoing slit 7 shown in FIG. 5. As a result, it is possible to regard the focal points F1 and F2 as one focal point according to the characteristic of the spectroscope. As shown in Equations (21) and (22), the total power P12 of the light rays at the focal points F1 and F2 and the total power P34 of the light rays at the focal points F3 and F4 are always constant and are equal to each other. In addition, the sum power of all light rays is always constant and has a same vale, as shown in Equation $$P_{12} = P_1 + P_2 = \frac{\alpha^2 + \beta^2}{4} \quad (21)$$

$$P_{34} = P_3 + P_4 = \frac{\alpha^2 + \beta^2}{4} \quad (22)$$

$$P = P_1 + P_2 + P_3 + P_4 = \frac{1}{2}(\alpha^2 + \beta^2) \quad (23)$$

Figure 12A:
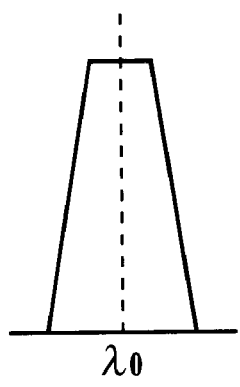
FIGS. 12A to 12C are views for describing spectrums of the conventional spectroscope.
Figure 12B:
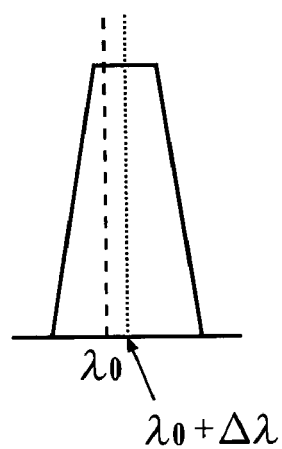
Figure 12C:
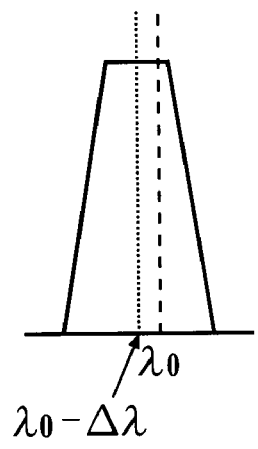

When the difference between the wavelength corresponding to a middle point of the focal points F1 and F2 and the wavelength corresponding to a middle point of the focal points F3 and F4 is not greater than a resolution of the spectroscope according to the embodiment of the present invention, the spectrum is displayed on the spectrum display unit 10 as shown in FIG. 12A. As a result, it is possible to obtain the spectrum having true central wavelength in the arbitrary polarization state.

Therefore, according to the spectroscope of the embodiment, it is possible to measure the spectrum having the true central wavelength with respect to the incident light having the arbitrary polarization state, even though the diffraction grating 5 (spectroscopic device) has any diffraction efficiency. As a result, it is possible to improve the spectroscopic characteristic in comparison to the spectroscope using the conventional depolarizer 2.

Figure 6:
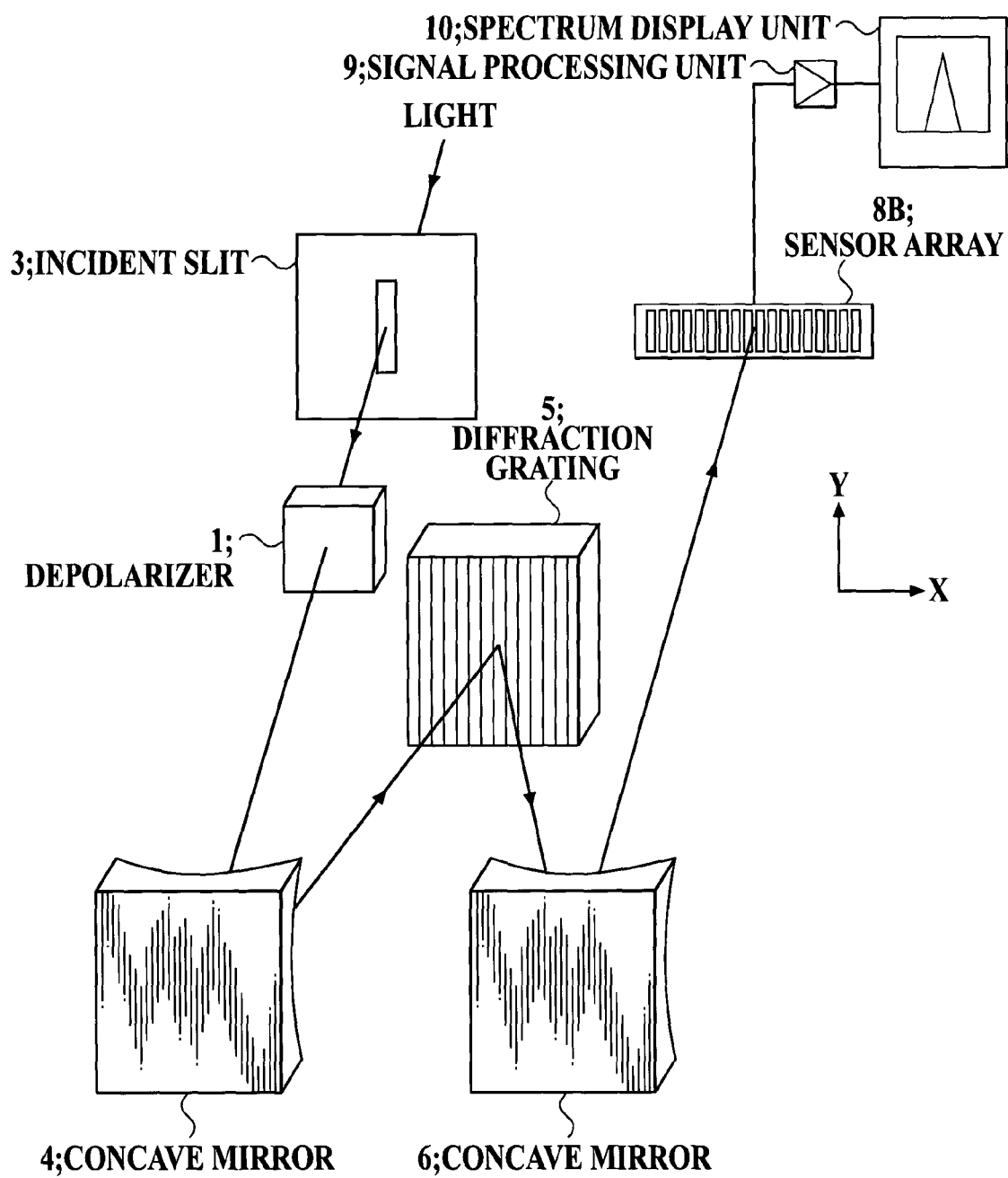
FIG. 6 is a view showing a configuration of a polychromater according to an embodiment of the present invention.
Figure 7A:
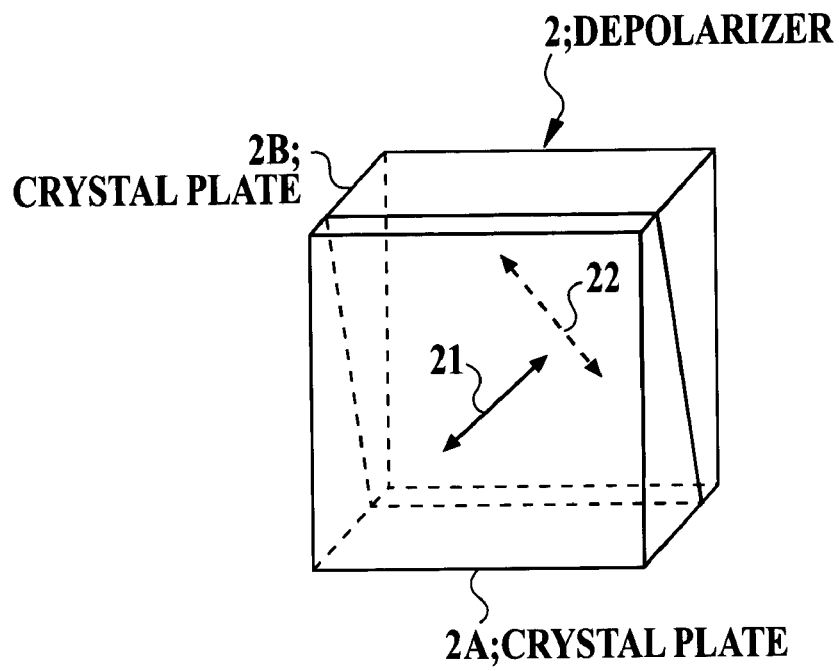
FIGS. 7A and 7B are a perspective view and a plan view each of which shows a configuration of a conventional depolarizer 2.
Figure 7B:
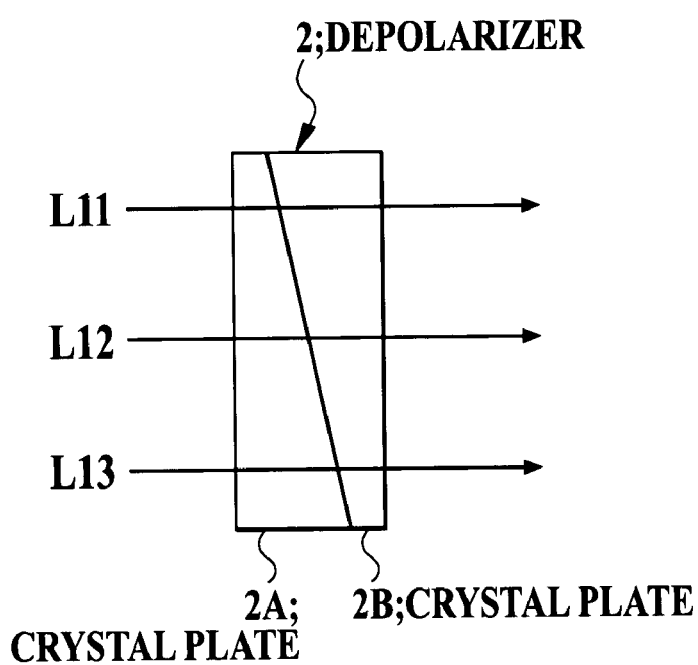

FIG. 6 is a view showing a configuration of a polychromater using the above-mentioned depolarizer 1. As shown in FIG. 6, the polychromater comprises a sensor array 8B (one-dimensional optical detector) instead of the outgoing slit 7 and the light receiving unit 8A of the spectroscope (referring to FIG. 3). In the polychromater, the diffraction grating 5 is used in a fixed condition. The light diffracted by the fixed diffraction grating 5 is reflected by the concave mirror 5 and arrives at the sensor array 8B. On the basis of the wavelength of the light, the position of the sensor array 8B, at the light arrives, is determined in the X direction. When the depolarizer 1 is used in the polychromater, it is possible to obtain the spectrum having the true central wavelength in the arbitrary polarization state by a reason similar to the above-mentioned spectroscope.

Incidentally, the present invention is not limited by the above-mentioned embodiment. For example, various examples are proposed as followings.

(1) Although the depolarizer 1 comprises four crystal plates 1A to 1D in the above-mentioned embodiment, it is possible to use a crystalline structure having a birefringence such as calcite, mica, magnesium fluoride, YVO$_4$, or rutile instead of crystal.

(2) Although the depolarizer 1 comprises four crystal plates 1A to 1D in the above-mentioned embodiment, at least one of the crystal sheets 1A and 1D may be omitted in the depolarizer 1. In other words, the minimum components for use in realizing the function of the depolarizer 1 are the crystal plates 1B and 1C whose optical axes 12 and 13 forms an angle of 45 degree.

(3) Although the above-mentioned embodiment relates to the spectroscope of Czerny-Turner type, the spectroscope of Czerny-Turner type does not limit the present invention. The present invention can be applied to various types of spectroscopes such as the spectroscope of Littrow type and so on.

(4) Although the above-mentioned embodiment has been explained with the single path spectroscope in which the light passes through the diffraction grating 5 using as the spectroscopic device, at one time, the single path spectroscope does not limit the present invention. It is possible to use the depolarizer 1 in a multi path spectroscope in which the light passes through the diffraction grating 5 using as the spectroscopic device, at several times. In the multi path spectroscope, the angle ξ of Equation (9) is intended to become large on the basis of locations of optical parts. As a result, the variation of the measured central wavelength is greater than that of the single path spectroscope, on the basis of the variation of the polarization state of light. Using the above-mentioned depolarizer 1, it is possible to obtain the spectrum having the true central wavelength in the arbitrary polarization state.

As described above, it is possible to measure the true central wavelength in the incident light having the arbitrary polarization state. In other words, it is possible to improve spectroscopic characteristic in comparison to the spectroscope or the polychromater using the conventional depolarizer.

What is claimed is:

1. A depolarizer comprising:
   a second birefringent plate having a thickness which continuously changes in a direction of an optical axis of the second birefringent plate; and
   a third birefringent plate having a thickness which continuously changes in a direction of 45 degree with respect to an optical axis of the third birefringent plate;
   wherein the second birefringent plate is stuck on the third birefringent plate so that a reduction direction of the thickness of the second birefringent plate and a reduction direction of the thickness of the third birefringent plate are opposite to each other.

2. A depolarizer as claimed in claim 1, comprising:
   a first birefringent plate having a thickness which continuously changes in a direction perpendicular to an optical axis of the first birefringent plate;
   wherein the first birefringent plate is stuck on the second birefringent plate so that a reduction direction of the thickness of the first birefringent plate and the reduction direction of the thickness of the second birefringent plate are opposite to each other.

3. A depolarizer as claimed in claim 1, comprising a fourth birefringent plate having a thickness which continuously changes in a direction of −45 degree with respect to an optical axis of the fourth birefringent plate;
   wherein the fourth birefringent plate is stuck on the third birefringent plate so that a reduction direction of the thickness of the fourth birefringent plate and the reduction direction of the thickness of the third birefringent plate are opposite to each other.

4. A depolarizer as claimed in claim 1, comprising:
   a first birefringent plate having a thickness which continuously changes in a direction perpendicular to an optical axis of the first birefringent plate; and
   a fourth birefringent plate having a thickness which continuously changes in a direction of −45 degree with respect to an optical axis of the fourth birefringent plate;
   wherein the first birefringent plate is stuck on the second birefringent plate so that a reduction direction of the thickness of the first birefringent plate and the reduction direction of the thickness of the second birefringent plate are opposite to each other; and
   the fourth birefringent plate being stuck on the third birefringent plate so that a reduction direction of the thickness of the fourth birefringent plate and the reduction direction of the thickness of the third birefringent plate are opposite to each other.

5. A depolarizer as claimed any one of claims 1 to 4, wherein each of the first to fourth birefringent plates is composed of a selected one of crystal, calcite, mica, magnesium fluoride, YVO4, and rutile.

6. A spectroscope comprising:
   the depolarizer claimed in any one of claims 1 to 4, which is positioned at a previous stage of a spectroscopic device;
   wherein a reduction direction of the thickness of the second birefringent plate and a dispersion direction of the spectroscopic device intersect orthogonally with each other.

7. A spectroscope as claimed in claim 6, wherein a light incident surface of the second birefringent plate is inclined with respect to an incident direction of the light in the depolarizer.

8. A spectroscope as claimed in claim 6, wherein a light passes through the spectroscopic device at several times.

9. A polychromater comprising:
   the depolarizer claimed in any one of claims 1 to 4, which is positioned at a previous stage of a spectroscopic device; and
   an one-dimensional optical detector for detecting an output light of the spectroscopic device, in parallel.

* * * * *